June 19, 1962    G. E. POWELL    3,039,700
LIQUID-METERING DEVICE
Filed Feb. 5, 1960
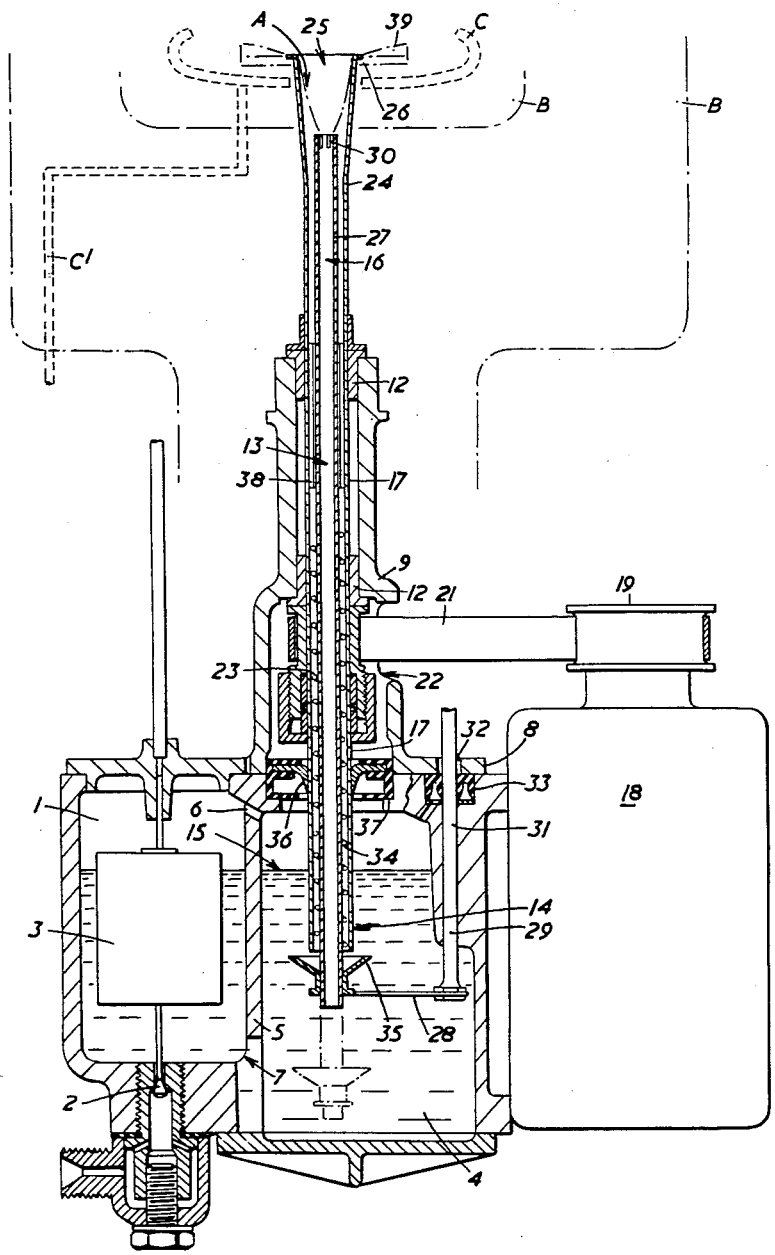
INVENTOR
GERALD E. POWELL
BY
Watson, Cole, Grindle & Watson
ATTORNEYS

United States Patent Office 3,039,700
Patented June 19, 1962

3,039,700
LIQUID-METERING DEVICE
Gerald E. Powell, Shoreham-by-Sea, England, assignor to Ricardo & Co., Engineers (1927) Limited, London, England, a company of Great Britain
Filed Feb. 5, 1960, Ser. No. 6,988
Claims priority, application Great Britain Feb. 9, 1959
3 Claims. (Cl. 239—126)

This invention relates to liquid-metering devices for delivering liquids at a substantially constant volumetric rate. The invention is applicable to such devices for various purposes, as for example for metering the lubricating oil supply to one or more parts, or for metering the supply of liquid fuel to the combustion chambers of liquid fuel burners.

A liquid-metering device according to the invention comprises a container which is of symmetrical form about an axis and is mounted for rotation about said axis with such axis vertical, liquid supply and control means arranged to deliver the liquid to be metered to the interior of the container while maintaining the liquid in the container at a desired level as measured near the axis during operation of the device, and driving means for rotating the container about its axis, the container being provided at its upper end with a liquid opening or openings through which liquid adjacent to the wall of the container which has been raised to a higher level than that near the axis is ejected when the container is rotated.

Conveniently the container is in the form of a vertically mounted open-topped tube of circular cross-section the open top of which constitutes the single outlet opening in which case the tube may be, for example, of approximately constant diameter throughout its length or, as may be preferable in many cases, may have a smoothly tapered internal bore with its diameter increasing progressively in the upward direction and either terminating at the upper end of the tube or leading into a cylindrical upper end portion of the tube. In one preferred arrangement the container is in the form of an open-topped tube the upper end at least of which is of frusto-conical form with its largest diameter at its open upper end.

The means for supplying liquid to and maintaining a desired level of liquid in the container may vary but in one preferred arrangement the liquid supply and control means comprises means for delivering the liquid to be metered to the interior of the container at a rate in excess of that at which liquid is ejected from the outlet opening or openings, and a spill pipe for the withdrawal or escape of excess liquid having its inlet located within the container and near the axis thereof and at a level such as to maintain the level of liquid in the container adjacent to said axis at the desired value.

In such an arrangement the spill pipe may be a single open topped overflow pipe which extends coaxially with the container upwards from the lower part thereof.

In most cases means will be provided for varying the rate at which liquid will be ejected from the container, and such means may comprise means for varying the desired level at which liquid is maintained in the container adjacent to the axis thereof, and/or means by which the speed of rotation of the container about its axis may be varied.

Thus in the case where the desired level is maintained by a spill pipe, the vertical position of the inlet to the spill pipe may be adjustable to vary the desired level of the liquid in the container near its axis.

The means for delivering liquid to the interior of the container might be gravity means including if desired a constant level device of the float-controlled type by which a constant head and if desired the constant liquid level adjacent to the axis of the container may be maintained. Alternatively, however, the means for delivering liquid to the interior of the container may include a helical passage arranged coaxially within the lower part of the container or a downwardly extending extension thereof the passage being arranged to rotate with the container or the container being arranged to rotate relative to the passage one end of which communicates with a source of liquid and the other end of which communicates with the interior of the container.

The helical passage may thus be formed by a member wrapped around and secured to the lower part of the spill pipe.

The lower end of the spill pipe preferably extends into a liquid reservoir with which the lower end of the helical passage also communicates, the lower end of the spill pipe having a screening member secured thereto to prevent aerated liquid from the spill pipe being drawn into the spiral passage.

One or more projections may be arranged within said container and extending from the wall thereof to assist in imparting motion to the liquid, these projections are preferably arranged below the tapered part of the bore of the container when such a taper is provided and may be in the form of radially inwardly extending vanes provided on the inner wall of the container.

A radially projecting lip, plate or the like may be provided adjacent the outlet opening or openings in the container which acts as a slinger for the liquid ejected therefrom, for the purpose, for example, for throwing such liquid into a collecting ring or the equivalent by which it may be fed to one or more desired points for burning, lubricating or other purposes, or returned to a sump or reservoir. When the fuel-metering device is used with liquid fuel burning apparatus the lip may be provided with vanes or the like to assist in the radial discharge of fuel ejected from the opening or openings.

As stated, the invention may be applied to liquid metering apparatus for a variety of purposes but is particularly applicable to liquid fuel burning apparatus thus according to a further aspect of the invention liquid fuel burning apparatus may include a metering device as set forth above in which the container adjacent the outlet opening or openings is formed to distribute liquid ejected therefrom into the surrounding air for burning.

The invention may be performed in various ways but one specific embodiment as applied to apparatus for use with a small oil-fuel burner utilised, for example, for heating the water boiler of a domestic hot-water or central heating system will now be described by way of example with reference to the accompanying drawing.

The apparatus comprises a liquid reservoir having two connecting compartments.

Oil fuel from a main oil-fuel storage tank is delivered, for example by gravity feed, to one of the compartments, referred to herein as the float chamber 1, through a needle valve 2 controlled by a conventional carburetor type float 3. The other compartment (hereafter called the main chamber 4) of the reservoir is separated from the float chamber 1 by a dividing wall 5, except for small air and liquid passages 6 and 7 respectively near the top and near the bottom of the dividing wall.

The float 3 therefore maintains an approximately constant level of oil-fuel in both the main chamber 4 and the float chamber 1.

The main chamber 4 is provided with a removable lid which provides a base plate 8 upon which is mounted a vertical tubular support structure 9 the upper part 11 of which constitutes a bearing support provided with two internally mounted, spaced self-lubricating bronze bearings 12. These bearings 12 serve to support a flow-metering device in the form of a tubular assembly indicated generally at 13 extending vertically through the support structure 9 with its lower end 14 beneath the surface, indicated at 15, of the oil fuel in the main chamber 4 and its upper end 16 above the top of the support structure.

The tubular assembly 13 comprises an outer pipe, referred to herein as the fuel pipe 12, of circular cross section the lower part of which is of constant diameter and is vertically supported to rotate within the bearings 12. The outer pipe can be rotated at speed about its axis by an electric motor 18 mounted adjacent to the reservoir 4, the drive shaft 19 of the electric motor 18 being coupled by a belt 21 passing through a slot 22 in the support structure 9 to a sleeve 23 which constitutes a pulley and which is secured to the fuel pipe 17.

The upper end portion of the outer pipe 17 constitutes the container (hereafter referred to for convenience as the outlet tube 24), and is in the form of an inverted conical frustum, the lower end of which merges smoothly into the upper end of the fuel pipe 17, while its upper end is open to form a mouth 25 which constitutes the outlet opening and which is outwardly flared to form, at its termination, a horizontal lip 26.

Mounted concentrically within the fuel pipe 17 is a non-rotating vertically extending and vertically movable overflow pipe 27 the upper end of which extends into the outlet tube 24, and the lower end of which protrudes beyond the lower end of the fuel pipe 17 where it is secured to one end of a horizontally extending rigid link 28 the other end of which is secured to the base of a vertically extending and vertically movable control rod 29. The control rod 24 extends through a vertical bore 31 formed in the housing of the main chamber 4, and through a corresponding bore 32 in the baseplate 8 to protrude vertically above the lid where it can be actuated as desired to adjust the height of the upper end of the overflow pipe 27 within the outlet tube 24. A seal 33 located within the upper end of the bore 31 in the housing closely surrounds the control rod 29 and may grip it to hold it in its adjusted position.

The upper end of the overflow pipe 27 is provided with a series of short vertical slots 30 which extend to the end of the overflow pipe and which act as weirs.

The overflow pipe 27 is located co-axially within the fuel pipe 17 by a helical member 34 which extends along, and is secured to the outer surface of the lower part of the overflow pipe 27, a small working clearance being provided between the helical member 34 and the inner surface of the fuel pipe 17. The helical member 34 thus affords, between the lower parts of the fuel pipe 17 and the overflow pipe 27, a helical passage and as the fuel pipe 17 is rotated in the correct direction oil fuel will be drawn upwards by the pumping action thus produced by viscous drag through the passage from the main chamber 4 towards and into the outlet tube 24, the oil fuel in the helical passage serving as a lubricant within the working clearance between the rotatable fuel pipe 17 and the non-rotatable helical member 34.

Alternatively the helical member may be secured to the inner surface of the lower part of the fuel pipe 17 and rotate with that pipe relatively to the nonrotatable outer wall of the overflow pipe 27 to produce a similar pumping effect.

A screening member 35 in the form of a hollow inverted conical frustum, is mounted concentrically upon the protruding lower end of the overflow pipe 27, the open upper end of the conical frustum being of larger diameter than the fuel pipe 17. This screening member 35 serves to ensure that aerated oil fuel emerging from the lower end of the overflow pipe 27 is not immediately drawn into the helical passage.

Where the fuel pipe passes through the baseplate 8, it is surrounded by an annular rubber seal 36 of the cup-leather type mounted in a rubber housing 37 which itself is housed between the base plate 8 and the housing of the main chamber.

To assist in imparting motion to the liquid in the fuel pipe 17 two or more projections in the form of radially inwardly extending vanes may be provided in the fuel pipe below the outlet tube 24 as indicated at 38. These vanes 38 extend inwardly almost to the overflow pipe 27 and thus divide this part of the fuel pipe into two or more vertical passages.

The operation of the device is as follows. A constant level of oil fuel in the reservoir is maintained by the float 3 in the float chamber 1. When the motor 18 is started, it rotates the fuel pipe 17 and oil fuel is drawn up the helical passage afforded by the helical member 34 secured to the overflow pipe 27. The oil fuel is thus delivered through the annular space between the upper ends of the fuel pipe 17 and of the overflow pipe 27, past the vanes 38 (when provided) to the interior of the outlet tube 24. During operation, due to the rotation of the outlet tube 24, the oil fuel within the fuel pipe 17 and outlet tube 24 is also rotated and thus the fuel close to the wall of the outlet tube 24 tends to rise up the inner wall of that tube so that the surface of the oil fuel is in the general form of a concave meniscus, indicated in broken lines at A. The level of the upper end of the meniscus A is determined by the level of the upper end of the overflow pipe 27 since any fuel of the "centre" of the meniscus which lies above the lower ends of the slots 30 in the overflow pipe which act as overflow weirs will flow therethrough and thus reduce the quantity of fuel available for rising up the wall. The outermost and highest part of the meniscus extends to the open top of the outlet tube 24 where the oil fuel is flung radially outwards from the lip 26 by centrifugal force.

The rate at which the fuel oil is so removed from the outlet tube 24 depends upon the speed of rotation of the outlet tube and upon the vertical position of the weirs 30 formed upon the upper end of the overflow tube 27. Generally, speed of rotation determines the profile of the oil-fuel meniscus A, while the vertical position of the weirs 30 determines the vertical height of the central, lowest part of the meniscus.

The spiral member 34 is so designed that the pumping action which it affords for a given speed of rotation is sufficient to supply oil fuel to the outlet tube 24 at a rate at least equal to and preferably greater than the maximum rate at which fuel is flung out of the outlet tube 24 at that speed, the excess oil fuel then flowing over the weirs 30 into the overflow pipe 27 and returning to the main chamber 4.

Thus for a given speed of rotation of the outlet tube 24 and a given vertical position of the weirs 30 the rate at which the fuel oil will be removed from the outlet tube will be substantially constant, thus affording the flow-metering action and the quantity of fuel available for ejection at a given speed being controlled by the position of the weirs relative to the meniscus.

If the control rod 29 is raised to raise the weirs 30, the vertical position of the central, lowest part of the oil-fuel meniscus A in the outlet tube 24 rise correspondingly, and the rate at which oil fuel is flung out of the outlet tube increases while the flow of excess oil fuel over the weirs decreases. If the control rod is lowered to lower the weirs, the vertical position of the central, lowest part of the oil-fuel meniscus drops correspondingly, the rate at which oil-fuel is flung out of the outlet tube decreases, and the flow of excess oil fuel over the weirs increases.

If the speed of rotation of the outlet tube in apparatus of the type described is maintained at for example about 3,000 r.p.m., the rate at which oil fuel is flung out of the outlet tube 24 may, in a typical case, be varied over the range from about $\frac{1}{20}$ pint per hour to about 4 pints per hour.

The oil fuel flung out of the outlet tube 24 may be delivered direct to a combustion chamber of the vapourising type indicated generally by the chain lines B in which case the lip 26 may be extended and provided with vanes 39 as indicated in chain lines to assist in the radial discharge of fuel ejected from the end of the outlet tube 24 or the oil may be collected and then atomised and delivered to a combustion chamber. For example the metering apparatus according to the invention may be combined with combustion apparatus of the kind described in the specification of British Patent No. 764,596 in which case the upper end of the outlet tube or other "container" would be arranged to lie at the appropriate point in the primary mixing passage which would itself extend vertically.

In a modification of the specific embodiment, where the metered oil fuel is required to be collected, a suitable stationary collecting ring as indicated by broken lines at C and having a discharge passage $C_1$ may be mounted in position around the mouth of the outlet tube 24.

What I claim as my invention and desire to secure by Letters Patent is:

1. A liquid metering device comprising a tube vertically mounted for rotation about its longitudinal axis, said tube being open at its upper and lower ends and the upper end portion of the tube being flared to eject the liquid by centrifugal force, liquid delivery means which supply liquid to the interior of said tube, driving apparatus which rotates said tube, a single vertical open-ended spill pipe which extends coaxially within said tube, the open upper end of said spill pipe being within said flared portion and below the open upper end of said tube, means for varying the vertical position of said spill pipe within said tube to vary the rate of flow of liquid through said open upper end of said tube.

2. A liquid metering device comprising a tube, means vertically mounting said tube for rotation about its longitudinal axis, said tube being open at its upper and lower ends and the upper end portion of the tube being flared to eject the liquid by centrifugal force, liquid delivery means for supplying liquid to the interior of said tube, driving apparatus for rotating said tube, a single vertical open-ended spill pipe which extends coaxially within said tube and is spaced radially inwardly of said tube, the upper end of said spill pipe being within said flared portion and below the upper end of said tube, the vertical position of said spill pipe within said tube being variable to vary the rate of flow of liquid through the open upper end of said tube, and a liquid reservoir communicating with the lower end of said spill pipe and with the lower end of said tube extending into a liquid reservoir and said lower end of said spill pipe having a screening member secured thereto capable of preventing aerated liquid from entering the lower end of said tube from said spill pipe, said liquid delivery means including a spiral element between said tube and said pipe.

3. A liquid metering device comprising a tube, means vertically supporting said tube for rotation about its longitudinal axis, liquid delivery means for supplying liquid to the interior of said tube, driving apparatus for rotating said tube, the upper end portion of the tube being upwardly flared to eject the liquid by centrifugal force, and a level control device for controlling the height of said liquid in said tube relatively to at least one opening in the upper end of said tube through which liquid is ejected when said tube is rotated, said control device comprising a vertical spill pipe which extends coaxially within said tube and has an open upper end within the flared portion of said tube and below the said opening, the vertical position of said spill pipe within said tube being variable to draw off variable proportions of the liquid before it reaches said opening in said tube.

References Cited in the file of this patent

UNITED STATES PATENTS

| | | |
|---|---|---|
| 1,712,184 | Wendel | May 7, 1929 |
| 1,957,398 | Wallace | May 1, 1934 |
| 1,999,946 | Rogers | Apr. 30, 1935 |
| 2,149,921 | Lea | Mar. 7, 1939 |
| 2,282,622 | Torrence | May 12, 1942 |
| 2,506,738 | Raypholtz | May 9, 1950 |
| 2,671,405 | Stoors | Mar. 9, 1954 |